(12) United States Patent
Liu et al.

(10) Patent No.: US 10,283,772 B2
(45) Date of Patent: May 7, 2019

(54) CATHODE MATERIAL FOR LI-ION BATTERY, METHOD FOR PREPARING THE SAME AND LI-ION BATTERY CONTAINING THE SAME

(71) Applicant: Ningde Amperex Technology Limited, Ningde Fujian Province (CN)

(72) Inventors: Hui Liu, Ningde (CN); Leimin Xu, Ningde (CN); Liang Wang, Ningde (CN); Meng Wang, Ningde (CN); Wei Wang, Ningde (CN); Na Liu, Ningde (CN)

(73) Assignee: NINGDE AMPEREX TECHNOLOGY LIMITED (CN)

( * ) Notice: Subject to any disclaimer, the term of this patent is extended or adjusted under 35 U.S.C. 154(b) by 211 days.

(21) Appl. No.: 15/409,370

(22) Filed: Jan. 18, 2017

(65) Prior Publication Data
US 2017/0207456 A1 Jul. 20, 2017

(30) Foreign Application Priority Data

Jan. 20, 2016 (CN) .......................... 2016 1 0036504

(51) Int. Cl.
*H01M 4/525* (2010.01)
*H01M 10/0525* (2010.01)
(Continued)

(52) U.S. Cl.
CPC ........... *H01M 4/525* (2013.01); *H01M 4/366* (2013.01); *H01M 4/505* (2013.01); *H01M 10/0525* (2013.01); *H01M 2004/028* (2013.01)

(58) Field of Classification Search
CPC ....... H01M 4/366; H01M 4/505; H01M 4/525
(Continued)

(56) References Cited

U.S. PATENT DOCUMENTS

2015/0311507 A1* 10/2015 Miki ..................... H01M 4/366
429/231.8

FOREIGN PATENT DOCUMENTS

| CN | 102969497 | 3/2013 |
| CN | 103493259 | 1/2014 |

OTHER PUBLICATIONS

Yu-Feng Deng et al., "Structure and electrochemical performance of spine LiMn1. 95NiO.0503.98FO.02 coated with Li—La—Zr—O solid electrolyte," J Solid State Electrochem, pp. 249-255, dated Oct. 4, 2013.

(Continued)

*Primary Examiner* — James M Erwin
(74) *Attorney, Agent, or Firm* — Tarolli, Sundheim, Covell & Tummino LLP (57) ABSTRACT

The present invention relates to the field of the Li-ion battery and, particularly, relates to a cathode material for the Li-ion battery, a method for preparing the same and a Li-ion battery containing the same. A surface of the cathode material of spinel type lithium-manganese-nickel-containing composite oxide of the present invention is coated with a complex coating layer composed of a first coating layer containing $Li_7La_3Zr_2O_{12}$ and a second coating layer containing $LiNbO_3$. The method includes: firstly coating the first coating layer containing $Li_7La_3Zr_2O_{12}$ on the surface of spinel type lithium-manganese-nickel-containing composite oxide in a solid phase method; and then coating the second coating layer containing $LiNbO_3$ in a hydro-thermal method. The cathode material of the present invention improves cycle stability and rate performance of spinel type lithium-manganese-nickel-containing composite oxide, and meanwhile reduces dissolution and erosion effect of the electrolyte on the cathode material during charging or discharging.

10 Claims, 4 Drawing Sheets

(51) Int. Cl.
    *H01M 4/36* (2006.01)
    *H01M 4/505* (2010.01)
    *H01M 4/02* (2006.01)

(58) Field of Classification Search
    USPC .......................................................... 429/223
    See application file for complete search history.

(56) References Cited

OTHER PUBLICATIONS

Chinese First Office Action dated May 31, 2017, pp. 1-6.

* cited by examiner

CATHODE MATERIAL FOR LI-ION BATTERY, METHOD FOR PREPARING THE SAME AND LI-ION BATTERY CONTAINING THE SAME

CROSS-REFERENCE TO RELATED APPLICATIONS

The present application claims priority to Chinese Patent Application No. 201610036504.8, filed on Jan. 20, 2016, the content of which is incorporated herein by reference in its entirety.

TECHNICAL FIELD

The present invention relates to the field of Li-ion batteries and, specifically, relates to a cathode material for a Li-ion battery, a method for preparing the same and a Li-ion battery containing the same.

BACKGROUND

Comparing with conventional secondary batteries such as lead-acid batteries, nickel-metal hydride batteries and the like, the Li-ion battery has advantages like high energy density, high output voltage, low self-discharge, no memory effect and environment friendliness, which therefore is widely applied and developed. The property of the key material of the power and energy storage Li-ion battery is the dominating factor of the performance of the battery, and the research on the cathode material has always been a hot spot for scientists. Cathode materials like $LiCoO_2$, $LiMnO_4$, $LiFePO_4$ and $LiNi_xCo_yMn_{1-x-y}O_2$ have been widely researched. However, the Li-ion battery system assembled by these materials has defects like low specific energy density, high cost and poor safety performance, which cannot satisfy the requirements of electric vehicles on energy storage batteries.

The cathode material of spinel type lithium-manganese-nickel-containing composite oxide is always the research hotspot of the cathode materials for the Li-ion battery due to its advantages of excellent rate performance, high working voltage, low cost and the like. However, the disadvantages of the cathode material of spinel type lithium-manganese-nickel-containing composite oxide like unstable surface structure and dissolution of manganese metal during cycling seriously limit its large-scale application.

In order to develop cathode material of spinel type lithium-manganese-nickel-containing composite oxide with excellent performance which meets the requirements of electric vehicles on rate performance of the battery, researchers have developed a variety of technical means to modify and improve the cathode material for spinel type lithium-manganese-nickel-containing composite oxide. The prior art discloses a modification method of the cathode material of spinel type lithium-manganese-nickel-containing composite oxide used for the Li-ion battery, which obtains the lithium-nickel-manganese oxide material coated with aluminum hydroxide mainly through liquid-phase coating, and then obtains the cathode material of lithium-nickel-manganese oxide coated and modified by alumina through hot processing in a muffle furnace at 300~450° C.; The performance of the modified cathode material of spinel type lithium-manganese-nickel-containing composite oxide was improved for about 10% compared with the uncoated material.

The prior art also discloses a method combining the sol-gel method and the solid phase method, so as to obtain uniform distribution of $Li_2TiO_3$ coated on the $LiNi_{0.5}Mn_{1.5}O_4$ material and good uniformity of the finally prepared cathode material, so that the prepared cathode material has good cycle performance and rate performance It is also disclosed to add the microwave sensitive material of zirconia in the preparing process of the precursor, so that the reaction materials can effectively absorb microwaves and be quickly heated up to the reaction temperature of 700~950° C., so as to significantly shorten the microwave sintering time to 1~10 minutes; at the same time when the lithium-nickel-manganese oxide material is sintered at high temperature, zirconia and the Li source react and generate a coating layer of lithium ion conductor $Li_2ZrO_3$ on the surface of lithium-nickel-manganese oxide, which significantly improves the cycle performance and rate performance of the product.

Simple solid state reaction has great difficulties in forming a dense coating layer on the surface of the cathode material of spinel type lithium-manganese-nickel-containing composite oxide, and the 5V spinel type lithium-manganese-nickel-containing composite oxide system inevitably has some side reactions; in the meantime, the presently used coating materials are all metal oxides or phosphates, these coating materials have low electronic conductivity and lithium ion conductivity coefficient, therefore, it is in an urgent need to find a modification method of the cathode material of spinel type lithium-manganese-nickel-containing composite oxide which can form a dense coating layer on the surface of the spinel type lithium-manganese-nickel-containing composite oxide, and the coating layer has higher electronic conductivity and lithium ion conductivity coefficient, so that the cathode material of spinel type lithium-manganese-nickel-containing composite oxide has higher cycle stability and rate performance.

SUMMARY

The top purpose of the present invention is to provide a cathode material for a Li-ion battery.

The second purpose of the present invention is to provide a method for preparing the cathode material for the Li-ion battery.

The third purpose of the present invention is to provide a Li-ion battery containing the cathode material for the Li-ion battery.

In order to accomplish the purposes of the present invention, the adopted technical solution are as follows:

The present invention relates to a cathode material of spinel type lithium-manganese-nickel-containing composite oxide, a surface of the cathode material of spinel type lithium-manganese-nickel-containing composite oxide is coated with a complex coating layer, the complex coating layer is composed of a first coating layer containing $Li_7La_3Zr_2O_{12}$ and a second coating layer containing $LiNbO_3$.

The present invention also relates to a method for preparing the cathode material of spinel type lithium-manganese-nickel-containing composite oxide. A surface of spinel type lithium-manganese-nickel-containing composite oxide is coated with the first coating layer containing $Li_7La_3Zr_2O_{12}$ in a solid phase method; the surface of the spinel type lithium-manganese-nickel-containing composite oxide coated with $Li_7La_3Zr_2O_{12}$ is further coated with the second coating layer containing $LiNbO_3$, so as to obtain the cathode material of spinel type lithium-manganese-nickel-containing composite oxide coated with the complex coating layer.

Specifically, the preparing method at least includes the following three steps:

(1) mixing a cathode material of spinel type lithium-manganese-nickel-containing composite oxide with a compound containing zirconium, a compound containing lanthanum and a lithium salt;

(2) performing mixed sintering after the mixing, so as to obtain a cathode material of spinel type lithium-manganese-nickel-containing composite oxide coated with a first coating layer containing $Li_7La_3Zr_2O_{12}$;

(3) performing hydro-thermal reacting of the obtained cathode material of spinel type lithium-manganese-nickel-containing composite oxide coated with the first coating layer, $Nb_2O_5$ and lithium salt, and then drying, so as to coat a second coating layer containing $LiNbO_3$ on a surface of the first coating layer, thereby obtaining a cathode material of spinel type lithium-manganese-nickel-containing composite oxide coated with a complex coating layer.

Preferably, the compound containing zirconium is at least one selected from a group consisting of $Zr(OH)_4$, $ZrOCl_2$, $ZrO_2$, $ZrCl_4$ and $ZrF_4$; the compound containing lanthanum is at least one selected from a group consisting of $La_2O_3$, $LaCl_3$ and $LaF_3$; the lithium salt is at least one selected from a group consisting of LiOH and $Li_2CO_3$.

Preferably, in step (1), a mole ratio of the compound containing zirconium and the cathode material of spinel type lithium-manganese-nickel-containing composite oxide is $10^{-4}$~0.1:1, a mole ratio of the compound containing lanthanum and the compound containing zirconium is 0.5~2:1, a mole ratio of the lithium salt and the compound containing zirconium is 1.5~4:1.

Preferably, in step (2), temperature of the mixed sintering is 300~900° C., time of the mixed sintering is 3~8 h.

Preferably, in step (2), a gas flow rate in the mixed sintering is 100~5000 ml/min; a heating rate of the mixed sintering is 1~10° C./min.

Preferably, a mole ratio of $Nb_2O_5$ and the cathode material of spinel type lithium-manganese-nickel-containing composite oxide is $10^{-4}$~0.1:1, a mole ratio of the lithium salt and $Nb_2O_5$ is 0.2~1:1.

Preferably, in step (3), temperature of the hydro-thermal reaction is 100~400° C., time of the hydro-thermal reaction is 12~48 h, temperature of the drying is 80~100° C.

The present invention also relates to a Li-ion battery which includes the cathode material for the Li-ion battery of the present invention.

The beneficial effects of the technical solution of the present invention are:

The complex coating layer of the present invention is composed of two layers which are respectively the coating layer of $Li_7La_3Zr_2O_{12}$ and the coating layer of $LiNbO_3$. The present invention makes full use of the advantages of high degree of crystallinity of the solid phase reaction and preparation and the uniform coating of the hydro-thermal reaction. The present invention firstly coats a coating layer of $Li_7La_3Zr_2O_{12}$ on the surface of spinel type lithium-manganese-nickel-containing composite oxide in a solid phase method, and then coats a layer of $LiNbO_3$ on the surface of the coating layer of $Li_7La_3Zr_2O_{12}$ in a hydro-thermal method, so as to obtain a cathode material of spinel type lithium-manganese-nickel-containing composite oxide with a complex coating layer. $Li_7La_3Zr_2O_{12}$ has high electronic conductivity at room temperature (~$10^{-4}$ S/cm), and in the meantime has good chemical stability and electro-chemical stability, and can be directly prepared in the air; $LiNbO_3$ not only has good lithium ion conductivity, but also helps to stabilize the structure of the first coating layer of $Li_7La_3Zr_2O_{12}$ and inhibit dissolution of metal ions. The complex coating layer of $Li_7La_3Zr_2O_{12}$ and $LiNbO_3$ of the present invention significantly improves the cycle stability and rate performance of spinel type lithium-manganese-nickel-containing composite oxide through the synergistic effect; since the cathode material and the electrolyte are separated by the surface coating layer, when the voltage reaches about 5V during charging or discharging, the electrolyte on the electrode surface will not be oxidized, decomposed or precipitated on the electrode surface, which reduces the dissolution and erosion effect of the electrolyte on the cathode material during charging or discharging. The modification process of the present invention is suitable for all the cathode materials of spinel type lithium-manganese-nickel-containing composite oxide, it is simple to operate, the manufacturing cost is low and the reproducibility is good, which is suitable for large-scale industrialized production.

DESCRIPTION OF EMBODIMENTS

The present invention is further described with the following embodiments and comparison example, however, these embodiments are merely used to illustrate the present invention, and the present invention is not limited to the following embodiments. All the modifications or equivalent substitutions to the technical solution of the present invention without departing from the spirit and scope of the technical solution of the present invention shall fall into the protection scope of the present invention.

The present invention relates to a cathode material of spinel type lithium-manganese-nickel-containing composite oxide containing a complex coating layer, the surface of the cathode material of spinel type lithium-manganese-nickel-containing composite oxide is coated with the complex coating layer, the complex coating layer is composed of a first coating layer containing $Li_7La_3Zr_2O_{12}$ and a second coating layer containing $LiNbO_3$. The structural formula of the cathode material of spinel type lithium-manganesenickel-containing composite oxide is $LiM_{x+y}Ni_{0.5-x}Mn_{1.5-y}O_4$, M is at least one of Co, Al, Cr, Fe, Mg, Zr and Ti, $0 \leq x < 0.5$ and $0 \leq y < 1.5$.

The present invention also relates to a method for preparing the cathode material of spinel type lithium-manganese-nickel-containing composite oxide with the complex coating layer, including at least the following three steps:

(1) mixing a cathode material of spinel type lithium-manganese-nickel-containing composite oxide with a compound containing zirconium, a compound containing lanthanum and a lithium salt;

In which: the compound containing zirconium is at least one selected from a group consisting of $Zr(OH)_4$, $ZrOCl_2$, $ZrO_2$, $ZrCl_4$ and $ZrF_4$; the compound containing lanthanum is at least one selected from a group consisting of $La_2O_3$, $LaCl_3$ and $LaF_3$; the lithium salt is at least one selected from a group consisting of LiOH and $Li_2CO_3$; the mole ratio of the compound containing zirconium and the cathode material of spinel type lithium-manganese-nickel-containing composite oxide is $10^{-4}$~0.1:1, the mole ratio of the compound containing lanthanum and the compound containing zirconium is 0.5~2:1, the mole ratio of the lithium salt and the compound containing zirconium is 1.5~4:1; the method of mixing is one of ball milling, grinding and magnetic stirring;

(2) performing mixed sintering after the mixing, so as to obtain the cathode material of spinel type lithium-manganese-nickel-containing composite oxide coated with a first coating layer containing $Li_7La_3Zr_2O_{12}$;

In which: a cathode material of spinel type lithium-manganese-nickel-containing composite oxide coated with a first coating layer containing $Li_7La_3Zr_2O_{12}$ is obtained by mixed sintering after mixing the first coating layer; the atmosphere of the mixed sintering is one of oxygen, argon and air; the temperature of the mixed sintering is 300~900° C., the time of the mixed sintering is 3~8 h; the gas flow rate in the mixed sintering is 100~5000 ml/min; the heating rate of the mixed sintering is 1~10° C./min;

(3) performing hydro-thermal reaction of the obtained cathode material of spinel type lithium-manganese-nickel-containing composite oxide coated with the first coating layer, $Nb_2O_5$ and lithium salt, and then drying, so as to coat a second coating layer containing $LiNbO_3$ on a surface of the first coating layer, thereby obtaining a cathode material of spinel type lithium-manganese-nickel-containing composite oxide coated with a complex coating layer.

In which: the mole ratio of $Nb_2O_5$ and the cathode material of spinel type lithium-manganese-nickel-containing composite oxide is $10^{-4}$~0.1:1, the mole ratio of the lithium salt and $Nb_2O_5$ is 0.2~1:1; the temperature of the hydro-thermal reacting is 100~400° C., the time of the hydro-thermal reacting is 12~48 h, and the temperature of the drying is 80-100° C.

Embodiments 1~4

A cathode material of spinel type lithium-manganese-nickel-containing composite oxide with a complex coating layer: the surface of the cathode material of spinel type lithium-manganese-nickel-containing composite oxide has a complex coating layer of $Li_7La_3Zr_2O_{12}$ and $LiNbO_3$, in which the structural formula of the cathode material of spinel type lithium-manganese-nickel-containing composite oxide is $LiM_{x+y}Ni_{0.5}Mn_{1.5-y}O_4$, M is one or more of Co, Al, Cr, Fe, Mg, Zr and Ti, $0 \leq x < 0.5$ and $0 \leq y < 1.5$.

The method for preparing the cathode material of the Li-ion battery includes:

(1) fully mixing a cathode material of spinel type lithium-manganese-nickel-containing composite oxide with a compound containing zirconium, a compound containing lanthanum and a lithium salt;

(2) performing mixed sintering of the evenly mixed sample, so as to obtain a cathode material of spinel type lithium-manganese-nickel-containing composite oxide with a first coating layer of $Li_7La_3Zr_2O_{12}$;

(3) placing the spinel type lithium-manganese-nickel-containing composite oxide with the first coating layer, $Nb_2O_5$ and lithium salt in a hydro-thermal reactor for hydro-thermal reaction, cooling to room temperature, washing and drying, so as to obtain a cathode material of spinel type lithium-manganese-nickel-containing composite oxide with a complex coating layer; the specific parameters are shown in Table 1.

TABLE 1

|  |  | Embodiment 1 | Embodiment 2 | Embodiment 3 | Embodiment 4 |
|---|---|---|---|---|---|
| Step 1 | Spinel type lithium-manganese-nickel-containing composite oxide | $LiNi_{0.5}Mn_{1.5}O_4$ | $LiNi_{0.5}Mn_{1.5}O_4$ | $LiNi_{0.5}Mn_{1.5}O_4$ | $LiMg_{0.05}Ni_{0.5}Mn_{1.45}O_4$ |
|  | Compound containing zirconium | $ZrO_2$ | / | $ZrO_2$ | $ZrO_2$ |
|  | Mole ratio of $ZrO_2$:spinel type lithium-manganese-nickel-containing composite oxide | 0.01:1 | / | 0.01:1 | 0.01:1 |
|  | Compound containing lanthanum | $La_2O_3$ | / | $La_2O_3$ | $La_2O_3$ |
|  | Mole ratio of $La_2O_3$:$ZrO_2$ | 1:0.75 | / | 1:0.75 | 1:0.75 |
|  | Lithium salt | LiOH | / | LiOH | $Li_2CO_3$ |
|  | Mole ratio of Lithium salt:$ZrO_2$ | 3.5:1 | / | 3.5:1 | 1.75:1 |
|  | Stirring method | magnetic stirring | / | magnetic stirring | magnetic stirring |
| Step 2 | Heating rate (° C./min) | 1 | / | 1 | 2 |
|  | Temperature of mixed sintering (° C.) | 800 | / | 500 | 500 |
|  | Time of sintering (h) | 5 | / | 5 | 5 |
|  | Gas flow rate (ml/min) | 2000 | / | 3000 | 2000 |
|  | Atmosphere of sintering | argon | / | argon | argon |
| Step 3 | Mole ratio of $Nb_2O_5$:spinel type lithium-manganese-nickel-containing composite oxide | / | 0.01:1 | 0.01:1 | 0.01:1 |
|  | Lithium salt | / | LiOH | LiOH | $Li_2CO_3$ |

TABLE 1-continued

|  | Embodiment 1 | Embodiment 2 | Embodiment 3 | Embodiment 4 |
|---|---|---|---|---|
| Mole ratio of Lithium salt:$Nb_2O_5$ | / | 0.5:1 | 0.5:1 | 0.25:1 |
| Temperature of hydro-thermal reaction (° C.) | / | 200 | 200 | 180 |
| Time of hydro-thermal reaction (h) | / | 24 | 24 | 24 |
| Temperature of drying (° C.) | / | 100 | 90 | 95 |

Comparison Example a cathode material of spinel type lithium-manganese-nickel-containing composite oxide of $LiNi_{0.5}Mn_{1.5}O_4$ without treatment.

Figure 1:
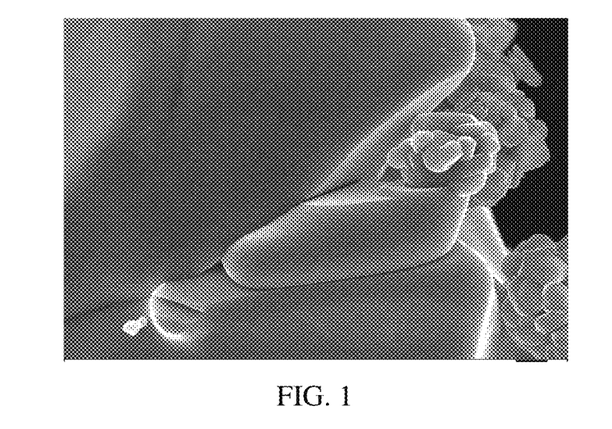
FIG. 1 is a SEM photograph of a cathode material of $LiNi_{0.5}Mn_{1.5}O_4$ of a Li-ion battery in Comparison Example.
Figure 2:
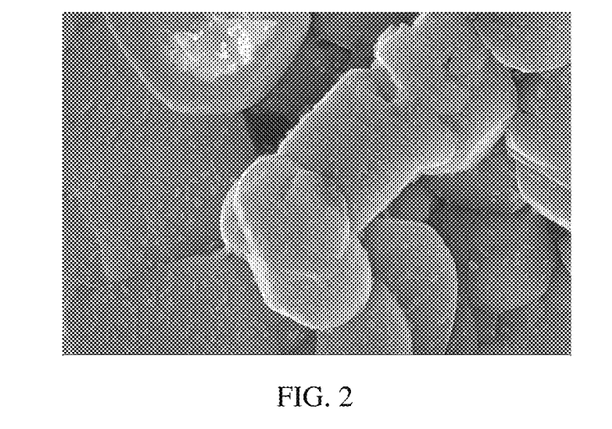
FIG. 2 is a SEM photograph of a cathode material of $LiNi_{0.5}Mn_{1.5}O_4$ of a Li-ion battery in Embodiment 1.
Figure 3:
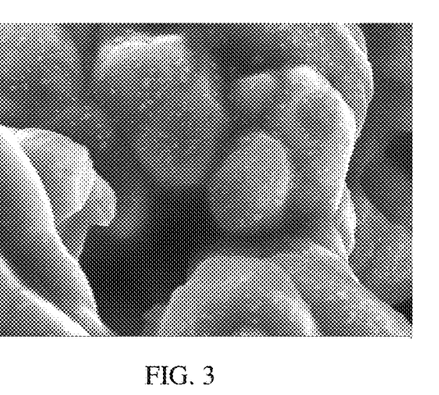
FIG. 3 is a SEM photograph of a cathode material of $LiNi_{0.5}Mn_{1.5}O_4$ of a Li-ion battery in Embodiment 3.

The scanning electron microscope (Scanning Electron Microscope, SEM) photograph of the cathode material of spinel type lithium-manganese-nickel-containing composite oxide in Comparison example is shown in FIG. 1 (×10000); in Embodiment 1, only a layer of $Li_7La_3Zr_2O_{12}$ is coated on the surface of spinel type lithium-manganese-nickel-containing composite oxide in a solid phase method, its SEM photograph is shown in FIG. 2 (×10000); the SEM photograph of the cathode material of spinel type lithium-manganese-nickel-containing composite oxide with a complex coating layer prepared in Embodiment 3 is shown in FIG. 3 (×10000).

Comparison Experiment of Rate Performance

Rate performance experiments are conducted to the cathode materials of the Li-ion batteries in Comparison example and Embodiments 1~3 under the same condition.

Experiment method: at 25° C., charging with 0.2 C (C is the capacity of the battery) rate, and then respectively discharging at 0.2 C/0.5 C/1.0 C/2.0 C/5.0 C/10.0 C/15.0 C/20.0 C rate.

Figure 4:
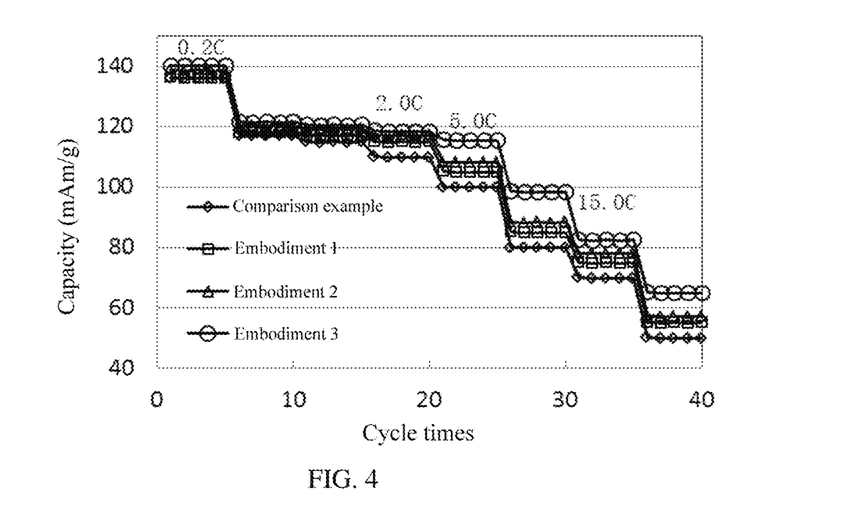
FIG. 4 shows graphs of rate performance of cathode materials of Li-ion batteries in Comparison Example and Embodiments 1~3.

The obtained experimental result is shown in FIG. 4. It can be known from FIG. 4 that, the cathode materials of the Li-ion battery prepared under the condition of the present invention have better rate performance Comparison Experiment of Cycle Stability The cycle stability experiments are conducted to the cathode materials of the Li-ion batteries prepared in Embodiments 1~3 and the cathode material of spinel type lithium-manganese-nickel-containing composite oxide of $LiNi_{0.5}Mn_{1.5}O_4$ in Comparison example under the same condition.

Experiment method: at 25° C., charging to 4.9V with 0.5 C (C is the capacity of the battery) rate, and then discharging with 1.0 C rate. The obtained experiment results are shown in FIG. 5 and FIG. 6.

Figure 5:
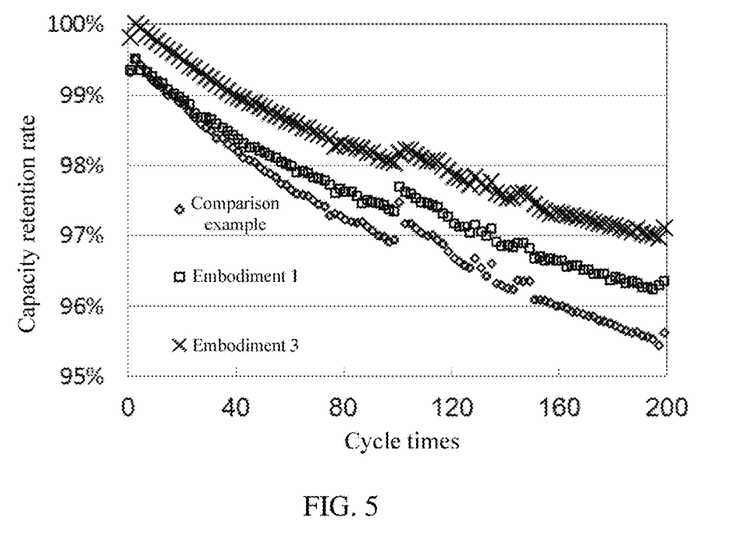
FIG. 5 shows graphs of cycle stability performance of cathode materials of Li-ion batteries in Comparison Example, Embodiment 1 and Embodiment 3.
Figure 6:
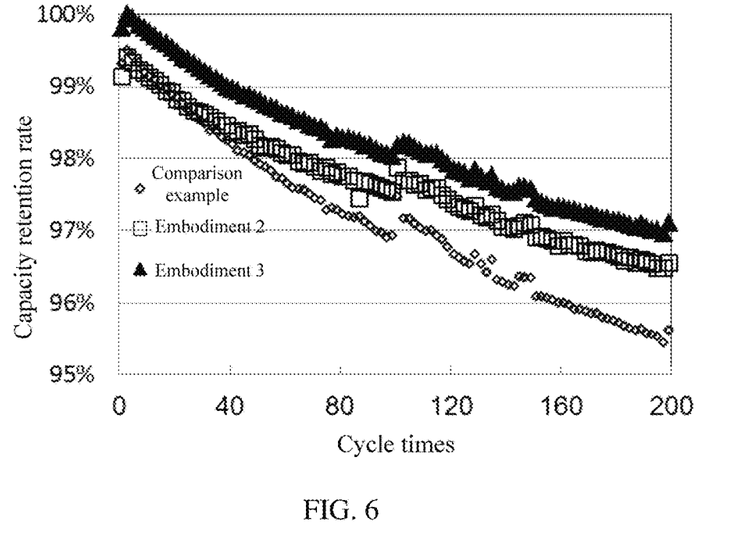
FIG. 6 shows graphs of cycle stability performance of cathode materials of Li-ion batteries in Comparison Example, Embodiment 2 and Embodiment 3.

It can be known from FIG. 5 and FIG. 6 that, the cathode materials of the Li-ion battery prepared under the condition of the present invention have better cycle stability.

Comparison Experiment of Mn Dissolution

The Mn dissolution experiments are conducted to the cathode materials of the Li-ion batteries prepared in Embodiments 1~4 and Embodiments 5~8 and the cathode material in Comparison example under the same condition.

Experiment method: respectively placing the cathode materials prepared in Comparison example, Embodiments 1~4 and Embodiments 5~8 in electrolyte (FEC:DMC=3:7), meanwhile the mass ratio of spinel type lithium-manganese-nickel-containing composite oxide and the electrolyte is 1:10, standby for 48 h under the air-isolated condition at 25° C., obtaining the supernatant in the electrolyte, detecting the content of Mn element in the electrolyte with the inductively coupled plasma spectrometer for the Mn dissolution experiments.

Embodiments 5~8

A cathode material of spinel type lithium-manganese-nickel-containing composite oxide with a complex coating layer: the surface of the cathode material of spinel type lithium-manganese-nickel-containing composite oxide has a complex coating layer of $Li_7La_3Zr_2O_{12}$ and $LiNbO_3$, in which the structural formula of the cathode material of spinel type lithium-manganese-nickel-containing composite oxide is $LiM_{x+y}Ni_{0.5}Mn_{1.5-y}O_4$, M is one or more of Co, Al, Cr, Fe, Mg, Zr and Ti, $0 \leq x < 0.5$ and $0 \leq y < 1.5$.

The steps for preparing the cathode materials of the Li-ion battery are the same as those of Embodiment 3, the specific parameters are shown in Table 2.

TABLE 2

|  |  | Embodiment 5 | Embodiment 6 | Embodiment 7 | Embodiment 8 |
|---|---|---|---|---|---|
| Step 1 | Spinel type lithium-manganese-nickel-containing composite oxide | $LiMg_{0.02}Ni_{0.5}Mn_{1.48}O_4$ | $LiTi_{0.02}Ni_{0.5}Mn_{1.48}O_4$ | $LiMg_{0.04}Ni_{0.5}Mn_{1.46}O_4$ | $LiMg_{0.04}Ni_{0.5}Mn_{1.46}O_4$ |
|  | Compound containing zirconium | $Zr(OH)_4$ | $ZrOCl_2$ | $ZrCl_4$ | $ZrF_4$ |
|  | Compound containing lanthanum | $LaCl_3$ | $La_2O_3$ | $LaCl_3$ | $LaF_3$ |
|  | Lithium salt | LiOH | $Li_2CO_3$ | LiOH | $Li_2CO_3$ |
|  | Mole ratio of compound containing zirconium:spinel type lithium-manganese-nickel-containing composite oxide | 0.01:1 | / | 0.01:1 | 0.01:1 |
|  | Mole ratio of compound containing lanthanum:compound containing zirconium | 1.5:1 | / | 1.5:1 | 1.5:1 |

TABLE 2-continued

|  |  | Embodiment 5 | Embodiment 6 | Embodiment 7 | Embodiment 8 |
|---|---|---|---|---|---|
|  | Mole ratio of lithium salt:compound containing zirconium | 7:3 | / | 7:3 | 6:3 |
|  | Stirring method | magnetic stirring | ball milling | grinding | ball milling |
| Step 2 | Heating rate (° C./min) | 1 | 4 | 5 | 10 |
|  | Temperature of mixed sintering (° C.) | 800 | / | 500 | 500 |
|  | Time of sintering (h) | 5 | / | 5 | 5 |
|  | Gas flow rate (ml/min) | 100 | 5000 | 500 | 2000 |
|  | Atmosphere for sintering | oxygen | argon | air | argon |
| Step 3 | Mole ratio of $Nb_2O_5$:spinel type lithium-manganese-nickel-containing composite oxide | 0.01:1 | $10^{-4}$:1 | 0.1:1 | $10^{-3}$:1 |
|  | Lithium salt | $Li_2CO_3$ | LiOH | LiOH | $Li_2CO_3$ |
|  | Mole ratio of lithium salt:$Nb_2O_5$ | 0.75:1 | 0.4:1 | 0.8:1 | 0.3:1 |
|  | Temperature of hydro-thermal reaction (° C.) | 100 | 200 | 300 | 400 |
|  | Time of hydro-thermal reaction (h) | 24 | 12 | 36 | 48 |
|  | Temperature of drying (° C.) | 80 | 100 | 90 | 95 |

Figure 7:
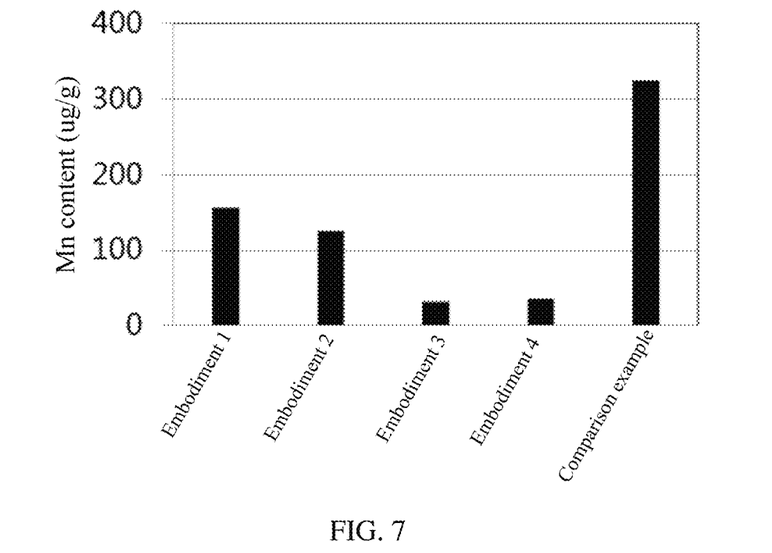
FIG. 7 is a comparison bar graph of Mn dissolution of cathode materials of Li-ion batteries in Comparison Example, Embodiments 1~4 in electrolyte (FEC:DMC=3:7)
Figure 8:
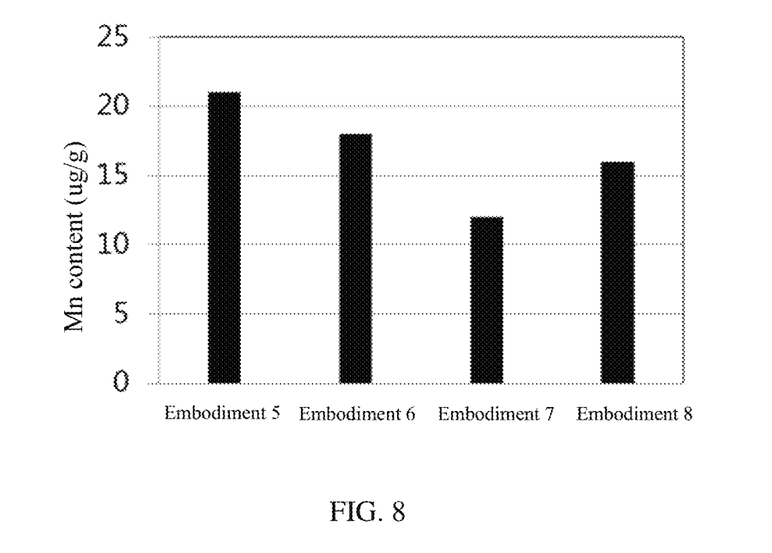
FIG. 8 is a comparison bar graph of Mn dissolution of cathode materials of Li-ion batteries in Embodiments 5~8 in electrolyte (FEC: DMC=3:7).

The prepared and obtained cathode materials of spinel type lithium-manganese-nickel-containing composite oxide with a complex coating layer according to the above-mentioned parameters have similar rate performance and cycle stability with the cathode material of Embodiment 3. As shown in FIG. 7 and FIG. 8, the prepared cathode materials of the Li-ion battery of the present invention have low Mn dissolution content; in the meantime the complex coating layer of $Li_7La_3Zr_2O_{12}$ and $LiNbO_3$ can further reduce the Mn dissolution. The complex coating layer of $Li_7La_3Zr_2O_{12}$ and $LiNbO_3$ of the present invention significantly improves the cycle stability and rate performance of spinel type lithium-manganese-nickel-containing composite oxide through the synergistic effect; since the cathode material and the electrolyte are separated by the surface coating layer, when the voltage reaches about 5V during charging or discharging, the electrolyte on the electrode surface will not oxidize, decompose and precipitate on the electrode surface, which reduces the dissolution and erosion effect of the electrolyte on the cathode material during charging or discharging.

It should be noted that, the person skilled in the art can make alternations and modifications to the above-mentioned embodiments according to the disclosure and illustration of the specification. Thus, the present invention is not limited to the disclosed and described embodiments as above, the equivalent modifications and alternations made to the present invention shall also fall into the protection scope of the claims of the present invention. Besides, the present specification uses some specific terms, however, these terms are merely for ease of describing and do not constitute any limit to the present invention.

What is claimed is:

1. A cathode material of spinel type lithium-manganese-nickel-containing composite oxide, wherein, a surface of the cathode material of spinel type lithium-manganese-nickel-containing composite oxide is coated with a complex coating layer, the complex coating layer is composed of a first coating layer containing $Li_7La_3Zr_2O_{12}$ and a second coating layer containing $LiNbO_3$.

2. The cathode material of spinel type lithium-manganese-nickel-containing composite oxide with the complex coating layer according to claim 1, wherein, a structural formula of the cathode material of spinel type lithium-manganese-nickel-containing composite oxide is $LiM_{x+y}Ni_{0.5}Mn_{1.5-y}O_4$, M is at least one of Co, Al, Cr, Fe, Mg, Zr and Ti, $0 \leq x < 0.5$ and $0 \leq y < 1.5$.

3. A method for preparing the cathode material of spinel type lithium-manganese-nickel-containing composite oxide according to claim 1, wherein, the method at least comprises following three steps:
(1) mixing a cathode material of spinel type lithium-manganese-nickel-containing composite oxide with a compound containing zirconium, a compound containing lanthanum and a lithium salt;
(2) performing mixed sintering after the mixing, so as to obtain a cathode material of spinel type lithium-manganese-nickel-containing composite oxide coated with a first coating layer containing $Li_7La_3Zr_2O_{12}$;
(3) performing hydro-thermal reaction of the obtained cathode material of spinel type lithium-manganese-nickel-containing composite oxide coated with the first coating layer, $Nb_2O_5$ and lithium salt, and then drying, so as to coat a second coating layer containing $LiNbO_3$ on a surface of the first coating layer, thereby obtaining a cathode material of spinel type lithium-manganese-nickel-containing composite oxide coated with a complex coating layer.

4. The method according to claim 3, wherein, the compound containing zirconium is at least one selected from a group consisting of $Zr(OH)_4$, $ZrOCl_2$, $ZrO_2$, $ZrCl_4$ and $ZrF_4$; the compound containing lanthanum is at least one selected from a group consisting of $La_2O_3$, $LaCl_3$ and $LaF_3$; the lithium salt is at least one selected from a group consisting of LiOH and $Li_2CO_3$.

5. The method according to claim 3, wherein, in step (1), a mole ratio of the compound containing zirconium and the cathode material of spinel type lithium-manganese-nickel-containing composite oxide is $10^{-4}$~0.1:1, a mole ratio of the compound containing lanthanum and the compound containing zirconium is 0.5~2:1, a mole ratio of the lithium salt and the compound containing zirconium is 1.5~4:1.

6. The method according to claim 3, wherein, in step (2), temperature of the mixed sintering is 300~900° C., time of the mixed sintering is 3~8 h.

7. The method according to claim 3, wherein, in step (2), a gas flow rate in the mixed sintering is 100~5000 ml/min; a heating rate of the mixed sintering is 1~10° C./min.

8. The method according to claim 3, wherein, a mole ratio of $Nb_2O_5$ and the cathode material of spinel type lithiummanganese-nickel-containing composite oxide is $10^{-4}$~0.1:1, a mole ratio of the lithium salt and $Nb_2O_5$ is 0.2~1:1.

9. The method according to claim 3, wherein, in step (3), temperature of the hydro-thermal reaction is 100~400° C., time of the hydro-thermal reaction is 12~48 h, temperature of the drying is 80-100° C.

10. A Li-ion battery, wherein, the Li-ion battery comprises the cathode material for the Li-ion battery according to claim 1.

\* \* \* \* \*